US011299140B2

(12) United States Patent
Honjo

(10) Patent No.: US 11,299,140 B2
(45) Date of Patent: Apr. 12, 2022

(54) VEHICLE PROVIDED WITH GENERATOR

(71) Applicant: KABUSHIKI KAISHA TOYOTA JIDOSHOKKI, Kariya (JP)

(72) Inventor: Fuminori Honjo, Aichi-ken (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 142 days.

(21) Appl. No.: 16/351,875

(22) Filed: Mar. 13, 2019

(65) Prior Publication Data

US 2019/0299972 A1 Oct. 3, 2019

(30) Foreign Application Priority Data

Mar. 27, 2018 (JP) ............................ JP2018-059180

(51) Int. Cl.
*B60W 20/13* (2016.01)
*B60W 10/06* (2006.01)
(Continued)

(52) U.S. Cl.
CPC .............. *B60W 20/13* (2016.01); *B60K 6/22* (2013.01); *B60K 6/46* (2013.01); *B60L 50/61* (2019.02); *B60L 58/12* (2019.02); *B60W 10/06* (2013.01); *B60W 10/08* (2013.01); *B60L 2200/36* (2013.01); *B60L 2200/40* (2013.01); *B60L 2240/26* (2013.01); *B60W 2510/244* (2013.01)

(58) Field of Classification Search
CPC ...... B60L 2240/26; B60L 58/12; B60L 58/13; B60W 40/13; B60W 2530/10; B60W 20/13; B60W 2510/244
See application file for complete search history.

(56) References Cited

U.S. PATENT DOCUMENTS

2004/0006414 A1 1/2004 Suzuki
2012/0208672 A1* 8/2012 Sujan .................... B60W 10/26 477/5
2018/0170396 A1* 6/2018 Burnette ............. B60W 10/184

FOREIGN PATENT DOCUMENTS

JP 2013-001373 A 1/2013
JP 2016-217851 A 12/2016

OTHER PUBLICATIONS

Extended European Search Report dated May 17, 2019 issued by the European Patent Office in counterpart application No. 19161032.8.

* cited by examiner

*Primary Examiner* — Alan D Hutchinson
*Assistant Examiner* — Andy Schneider
(74) *Attorney, Agent, or Firm* — Sughrue Mion, PLLC

(57) ABSTRACT

A vehicle provided with a generator generating electric power by using motive power outputted from an internal combustion engine includes an electric power storage device, an electric motor driving a vehicle, a controller executing charging control of the electric power storage device, and a weight estimator estimating a vehicle weight while the vehicle is moving. While the vehicle is driven by the electric motor, the controller starts operation of the internal combustion engine to start charging the electric power storage device when a SOC of the electric power storage device is reduced to a charging start SOC or less, and to stop the operation of the internal combustion engine to stop charging the electric power when the SOC of the electric power storage device is at or greater than a charging stop SOC. The charging stop SOC is set based on the vehicle weight estimated by the weight estimator.

9 Claims, 7 Drawing Sheets

SET CHARGING STOP SOC
S21 CONDITIONS FULTILLED? (NO / YES)
S22 CALCULATE WORK AMOUNT OF MG
S23 CALCULATE VEHICLE ACCELERATION
S24 ESTIMATE VEHICLE WEIGHT
S25 SET CHARGING STOP SOC
RETURN

(51) Int. Cl.

| | |
|---|---|
| ***B60W 10/08*** | (2006.01) |
| ***B60L 50/61*** | (2019.01) |
| ***B60K 6/46*** | (2007.10) |
| ***B60K 6/22*** | (2007.10) |
| ***B60L 58/12*** | (2019.01) |

VEHICLE PROVIDED WITH GENERATOR

CROSS-REFERENCE TO RELATED APPLICATION

This application claims priority to Japanese Patent Application No. 2018-059180 filed on Mar. 27, 2018, the entire disclosure of which is incorporated herein by reference.

BACKGROUND ART

The present disclosure relates to a vehicle provided with a generator, more specifically, to a vehicle provided with a generator that is driven by an internal combustion engine to generate electric power to charge an electric power storage device.

The weight of commercial vehicles used for transportation of cargos and tourists (e.g., trucks and buses) changes greatly, for example, by loading and unloading of cargos. In this type of a vehicle in which the vehicle weight is changed greatly, in order to meet the recent demands for the fuel efficiency and drivability, a travel driving control appropriate for the vehicle weight is required. For example, Japanese Patent Application Publication 2016-217851 discloses a vehicle that estimates the vehicle weight while the vehicle is moving.

In a series hybrid vehicle that includes a battery, a generator driven by an engine to charge the battery, and a motor for driving the vehicle which is driven by at least one of electric power discharged from the battery and electric power generated by the generator, when the state of charge (SOC) of the battery is reduced, the charging of the battery by the generator is performed by operating the engine while the vehicle is moving. A change in the vehicle weight needs to be considered for the control of the charging of the battery.

In the series hybrid vehicle, the consumption of the electric power from the battery while the vehicle is moving is increased as the vehicle weight becomes larger. In a case in which the control of the charging of the battery is uniform regardless of the vehicle weight, when the vehicle weight is small, the charging of the battery is controlled appropriately, whereas when the vehicle weight becomes larger due to increased load, the charging of the battery by the generator takes place more frequently.

The present disclosure is directed to providing a vehicle provided with a generator, the vehicle being configured so that a charging control appropriate for the current vehicle weight is achieved even if the vehicle weight is changed.

SUMMARY

In accordance with an aspect of the present disclosure, there is provided a vehicle provided with a generator, the generator being configured to generate electric power by using motive power outputted from an internal combustion engine. The vehicle provided with a generator includes an electric power storage device to which the electric power generated by the generator is charged, an electric motor driving a vehicle, the electric motor being configured to be driven by at least one of electric power discharged from the electric power storage device and the electric power generated by the generator, a controller configured to execute charging control of the electric power storage device, and a weight estimator configured to estimate a vehicle weight while the vehicle is moving. While the vehicle is driven by the electric motor, the controller is configured to start operation of the internal combustion engine to start charging the electric power storage device by the generator when a state of charge (SOC) of the electric power storage device is reduced to a charging start SOC or less, and to stop the operation of the internal combustion engine to stop charging the electric power when the SOC of the electric power storage device is at or greater than a charging stop SOC. The charging stop SOC is set based on the vehicle weight estimated by the weight estimator.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof may best be understood by reference to the following description of the presently preferred embodiments together with the accompanying drawings in which.

DETAILED DESCRIPTION OF THE EMBODIMENTS

Figure 1:
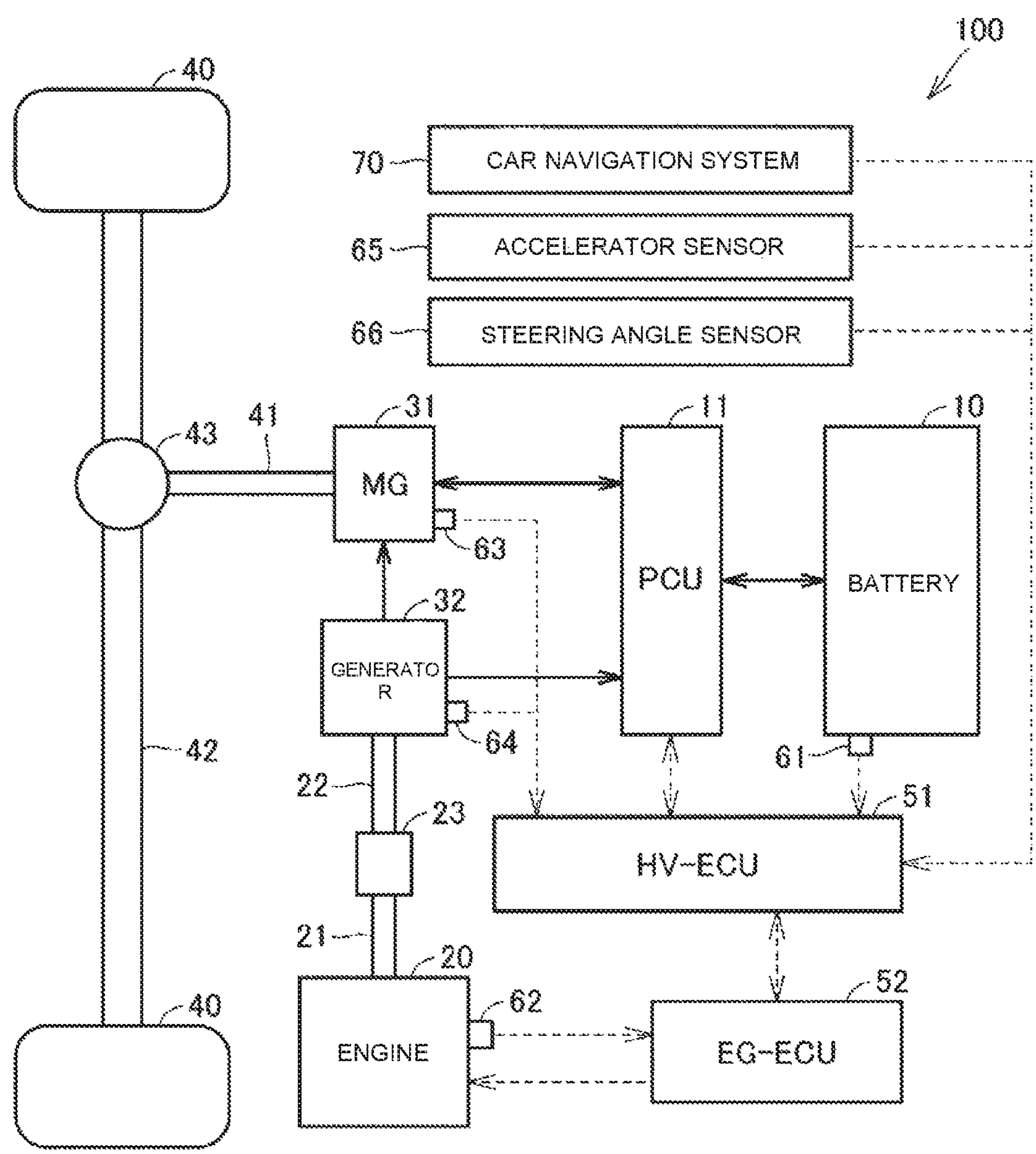
FIG. 1 is a schematic view of a vehicle provided with a generator according to a first embodiment of the present disclosure.

The following will describe embodiments of the present disclosure with reference to the accompanying drawings. It is to be noted that similar or the same parts or elements having the same name and function among the embodiment and its modifications are designated by the same reference numerals and the description thereof will not be reiterated.

FIG. 1 is a schematic view of a vehicle 100 according to a first embodiment of the present disclosure. For example, the vehicle 100 is a pick-up truck that includes a carrier (not shown).

Referring to FIG. 1, the vehicle 100 includes a battery 10, a power control unit 11 (hereinafter referred to as the PCU 11), an engine 20, a motor generator 31 (hereinafter referred to as the MG 31), a generator 32, and a pair of driving wheels 40. The vehicle 100 further includes various electronic control units (ECUs), namely, a HV-ECU 51 and an EG-ECU 52, which will be described in detail later. The battery 10 corresponds to the electric power storage device of the present disclosure.

The engine 20 is an internal combustion engine that outputs motive power by converting combustion energy generated by combustion of fuel (e.g., gasoline and diesel) to motive energy of locomotion component such as a piston and a rotor. The MG 31 is an electronic apparatus that is configured to convert the electric energy to the mechanical energy and to convert the mechanical energy to the electric energy. The generator 32 is an electronic apparatus that is configured to convert the mechanical energy to the electronic energy. In the present embodiment, a diesel engine is used for the engine 20 and a three-phase alternating current system electric generator is used for the MG 31 and the generator 32. The engine 20 may include a turbocharger (e.g., variable geometric turbocharger) in an intake-exhaust system (not shown).

The vehicle 100 of the present embodiment is a series hybrid vehicle. In the vehicle 100, the MG 31 (drive motor that drives the vehicle) serves as an electric motor that drives the driving wheels 40, and the generator 32 is driven by the engine 20 thereby to generate electric power. Electric power generated by the generator 32 and electric power stored in the battery 10 are power source for driving the MG 31. In other words, the MG 31 is driven by at least one of electric power discharged from the battery 10 and the electric power generated by the generator 32 to drive the vehicle 100. More specifically, a rotary shaft 21 of the engine 20 and a rotary shaft 22 of the generator 32 are mechanically connected to each other through a gear 23, and the rotary shaft 22 of the generator 32 rotates with the rotation of the rotary shaft 21 of the engine 20, so that the generator 32 generates electric power. A rotary shaft 41 of the MG 31 is not mechanically connected to the rotary shafts 21, 22, but is connected to the driving shaft 42 through a power transmission gear 43. The rotation of the driving shaft 42 rotates the driving wheels 40 mounted on the opposite ends of the driving shaft 42. Torque (driving force) outputted to the rotary shaft 41 of the MG 31 is transmitted through the power transmission gear 43 to the driving shaft 42, so that the driving shaft 42 is rotated by the driving force of the MG 31. The rotation of the driving shaft 42 rotates the driving wheels 40 mounted on the opposite ends of the driving shaft 42.

When the vehicle 100 is accelerated, the MG 31 functions as the electric motor and drives the driving wheels 40 of the vehicle 100. When the acceleration of the vehicle 100 is reduced at the braking of the vehicle 100 and at the descending slope, the MG 31 functions as the generator and performs regenerative power generation. Electric power generated by the MG 31 is supplied to the battery 10 through the PCU 11.

The generator 32 is configured to generate electric power by using the motive power outputted from the engine 20 (engine electric power generation). Electrical power generated by the generator 32 (engine generated electric power) is supplied to the MG 31 from the generator 32 to the MG 31 and also to the) battery 10 through the PCU 11.

The PCU 11 includes two inverters corresponding to the MG 31 and the generator 32, respectively, and a boost converter that increases the voltage of direct current supplied to the inverters to the voltage of the battery 10 (e.g., 600 V) or greater. The PCU 11 is operable in response to a control signal from the HV-ECU 51 and executes the conversion of the electric power between the battery 10 and the MG 31 and also between the battery 10 and the generator 32. The PCU 11 is capable of separately controlling the condition of the MG 31 and the condition of the generator 32.

The battery 10 is a rechargeable direct current electrical power source. The rated voltage of the battery 10 is, for example, between 300 V and 450 V. The battery 10 includes, for example, a secondary battery (rechargeable battery). For example, a lithium ion battery may be used for the secondary battery. The battery 10 may include a battery pack provided with a plurality of secondary batteries (e.g., lithium-ion battery) configured in series and/or parallel. The secondary battery forming the battery 10 is not limited to a lithium-ion battery, but may be other type of secondary batteries (e.g., a nickel hydrogen battery, an electrolyte secondary battery, and an all-solid electrolyte secondary battery). In addition, a large volume capacitor may be used for the battery 10.

A monitoring unit 61 is provided for the battery 10 for monitoring the condition of the battery 10. The monitoring unit 61 includes various sensors that detect the condition of the battery 10 (e.g., the temperature, the electric current, and the voltage), The HV-ECU 51 is configured to determine the condition of the battery 10 (e.g., SOC) based on outputs from the monitoring unit 61.

In addition, a monitoring unit 62 is provided for the engine 20 for monitoring the condition of the engine 20. The monitoring unit 62 includes various sensors that detect the condition of the engine 20 (e.g., the temperature of cooling water, the flow rate of intake air, and the rotation speed). The HV-ECU 51 and the EG-ECU 52 are configured to determine the condition of the engine 20 based on the outputs from the monitoring unit 62.

Additionally, monitoring units 63, 64 are provided for the MG 31 and the generator 32, respectively, for monitoring the conditions of the MG 31 and the generator 32. The monitoring units 63, 64 include various sensors that detect the respective conditions of the MG 31 and the generator 32 (e.g., the temperature and the rotation speed). The HV-ECU 51 is configured to determine the conditions of the MG 31 and the generator 32 based on outputs from the monitoring units 63, 64.

The ECUs of the vehicle 100, namely, the HV-ECU 51 and the EG-ECU 52, includes a central processing unit (CPU) as a processing device, a memory device, an input port and an output port for transferring various signals (none shown). The memory device includes a random access memory (RAM) as a processing memory, and a storage memory (e.g., a read only memory (ROM) and a rewritable non-volatile memory. Each of the ECUs receives the signals from the various devices (e.g., sensors) connected to the input port and controls various devices connected to the output port based on the received signals. Various control processes are controlled by the CPU executing the programs stored in the memory device. It is noted that various controls executed by the ECUs need not necessarily be carried out by using software, but may be carried out by using dedicated hardware (an electronic circuit). The HV-ECU 51 and the EG-ECU 52 function as the controller of the present disclosure.

The HV-ECU 51 calculates the output demand value for the engine 20 and the output demand values for the MG 31 and the generator 32 (e.g., torque demand value). The HV-ECU 51 sends the output demand value for the engine 20 to the EG-ECU 52 and controls electric power supply to the MG 31 and the generator 32 (and hence the output torques of the MG 31 and the generator 32) based on the output demand values for the MG 31 and the generator 32. The HV-ECU 51 may control the electric power (the rate of the electric power supply) and the frequency supplied to the MG 31 and the generator 32 by controlling the PCU 11 and the like. The HV-ECU 51 controls the charging and discharging of the battery 10 by controlling the PCU 11 and the like.

Various devices connected to the input port of the HV-ECU 51 include an accelerator sensor 65, a steering angle sensor 66, and a car navigation system 70 in addition to the various sensors included in the monitoring units 61, 63, 64.

The accelerator sensor 65 detects the degree of depression of an accelerator pedal (not shown) of the vehicle 100 as the opening degree of the accelerator and sends the detection result (a signal indicative of the opening degree of the accelerator) to the HV-ECU 51. The HV-ECU 51 increases the driving force of the MG 31 as the degree of depression of the accelerator pedal increases.

The steering angle sensor 66 detects the steering angle corresponding to the angular position of a steering wheel (not shown) of the vehicle 100, and sends the detection result (a signal that is indicative of the steering angle) to the HV-ECU 51.

The car navigation system 70 has the map database and identifies the position of the vehicle 100 using a signal from a global positioning system (GPS) satellite. The car navigation system 70 executes a path search to obtain the optimum route (e.g., the shortest route) from the current location of the vehicle 100 to the destination in response to the direction by the user and shows the optimum route obtained by the path search on the map. The car navigation system 70 updates the map database at any time when receiving the newest map information from the data center.

The EG-ECU 52 receives the output demand value for the engine 20 from the HV-ECU 51 and executes the operation control of the engine 20 (e.g., the fuel injection control, the ignition control, and the flow rate of intake air) so that the motion energy corresponding to the output demand value may be generated by the engine 20. The engine electric power generation is executed by the operation of the engine 20, and the engine 20 is at a stop while the engine power generation is not carried out. Operating the engine 20 causes the generator 32 to generate the engine generated electric power. The EG-ECU 52 receives detection data from the various sensors provided in the monitoring unit 62 and sends such data to the HV-ECU 51.

The vehicle 100 is driven by the MG 31 driving the driving wheels 40. The HV-ECU 51 starts charging the battery 10 by the engine generated electric power when the SOC of the battery 10 is reduced to the charging start SOC or less while the vehicle 100 is moving, and stops charging the battery 10 when the SOC of the battery 10 is increased to the charging stop SOC or greater. The following will describe the charging control executed by the HV-ECU 51 with reference to FIG. 2.

Figure 2:
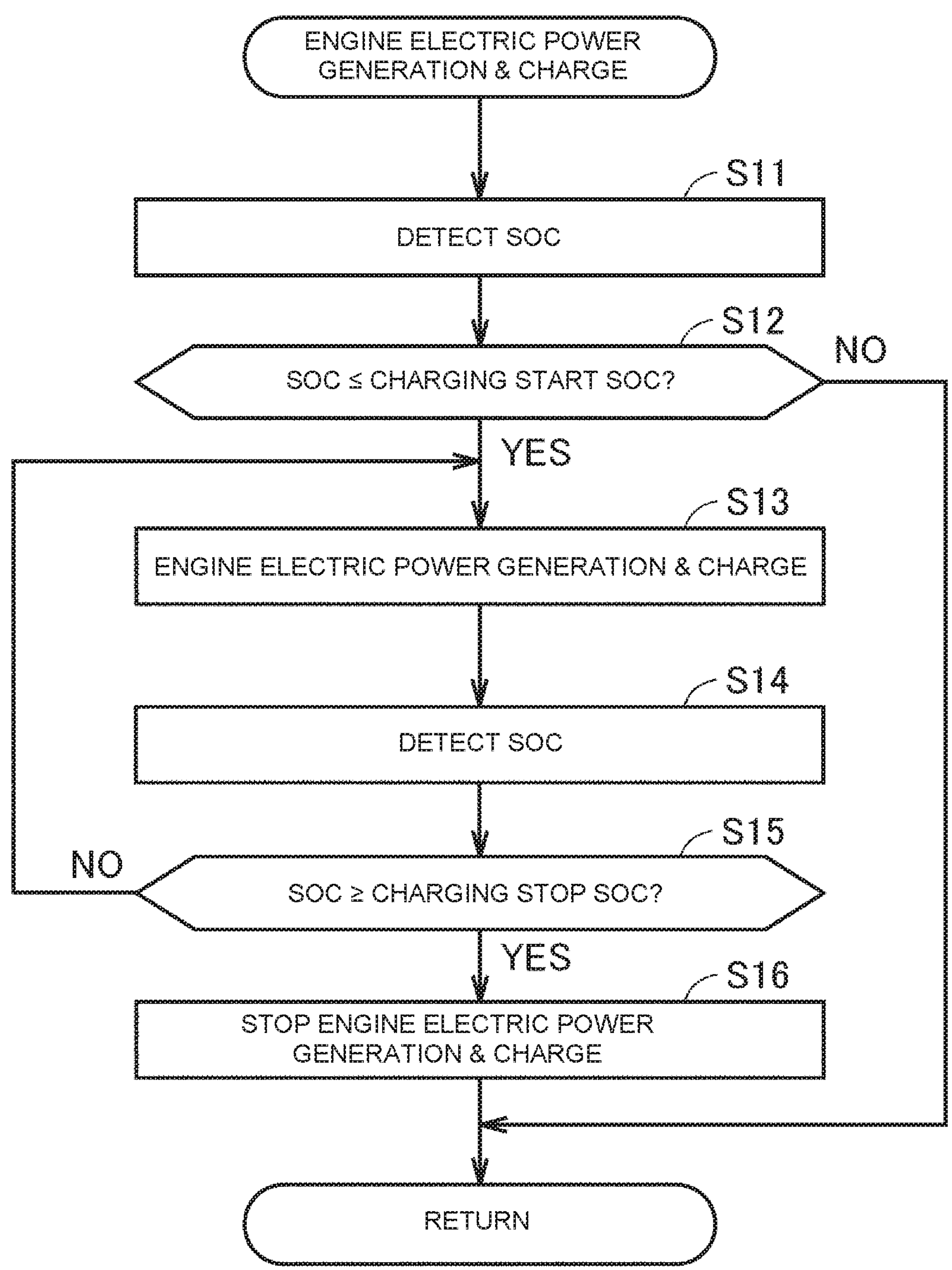
FIG. 2 is a flow chart showing a process of a charging control executed by a controller of the vehicle according to the first embodiment.

FIG. 2 shows a flow chart showing the process of the charging control executed by the HV-ECU 51. The process shown by this flow chart includes Steps S11 through S16, which is called from the main routine and repeatedly executed at a specified time interval while the vehicle 100 is moving. It is to be noted that a method for setting the charging start SOC and the charging stop SOC used at Steps S12 and S15, respectively, will described later.

Referring to FIG. 2, the HV-ECU 51 detects the SOC of the battery 10 (Step S11), The SOC indicates the remaining battery power, and for example, a proportion of the current battery charge to the full charge is indicated by the percent (0% to 100%). For the measurement of the SOC, various known methods such as the current integration method (Coulomb counting method) and the estimation of the open circuit voltage (OCV) may be used.

The HV-ECU 51 determines whether or not the SOC of the battery 10 measured at Step S11 is equal to or less than the charging start SOC at Step S12. If it is determined that the SOC of the battery 10 is greater than the charging start SOC (NO at Step S12), the control process returns to the main routine.

If it is determined that the SOC of the battery 10 is equal to or less than the charging start SOC (YES at Step S12), the HV-ECU 51 executes the charging of the battery 10 by the engine generated electric power at Step S13. More specifically, the HV-ECU 51 sends a request to the EG-ECU 52 to drive the engine 20 under the specified condition appropriate for the electric power generation. The engine 20 is controlled by the EG-ECU 52 in response to such request, so that the generator 32 generates the engine generated electric power that is greater than the electric power consumed by moving the vehicle 100. In addition, the HV-ECU 51 controls the PCU 11 so that the engine generated electric power is supplied to the battery 10. Accordingly, the battery 10 is charged by the engine generated electric power, and the SOC of the battery 10 is increased.

Subsequently, the HV-ECU 51 detects the SOC of the battery 10 at Step S14, for example, by the same method as Step S11, and determines whether or not the detected SOC of the battery 10 is equal to or greater than the charging stop SOC at Step S15. While it is determined that the SOC of the battery 10 is less than the charging stop SOC (NO at Step S15), the charging of the battery 10 by the engine generated electric power continues (Steps S13 through S15).

If it is determined that SOC of the battery 10 is equal to or greater than the charging stop SOC (YES at Step S15), the HV-ECU 51 sends instruction to the EG-ECU 52 to stop the engine 20 and controls the PCU 11 to stop the electric power supply to the battery 10.

While the vehicle 100 is moving, the above-described process shown in FIG. 2 is repeatedly performed, so that the engine 20 is operated every time the SOC of the battery 10 is reduced to the charging start SOC or less so as to execute the charging of the battery 10 by the engine generated electric power. According to the process shown in FIG. 2, the SOC of the battery 10 is maintained within the range between the charging start SOC and the charging stop SOC. It is noted that the process shown in FIG. 2 may be carried out only while the vehicle 100 is moving, or may also be carried out at a specified time interval while the vehicle 100 is at a stop as well as while the vehicle 100 is moving.

In a vehicle in which the driving wheels are driven by an electric motor which receives electric power from a battery, the consumption of electric power of the battery while the vehicle is moving is increased as the weight of the vehicle becomes larger. In a case in which the control of the charging of the battery is uniform regardless of the vehicle weight, and the charging of the battery starts when the SOC of the battery is equal to or less than the charging start SOC (a constant value regardless of the vehicle weight) and the charging of the battery stops when the SOC of the battery is equal to or greater than the charging stop SOC (a constant value regardless of the vehicle weight) while the vehicle is driven by the electric motor in the vehicle, the frequency of the charging of the battery increased as the vehicle weight becomes larger. The following will describe such increase of the frequency of the charging of the battery with reference to FIGS. 3 and 4.

Figure 3:
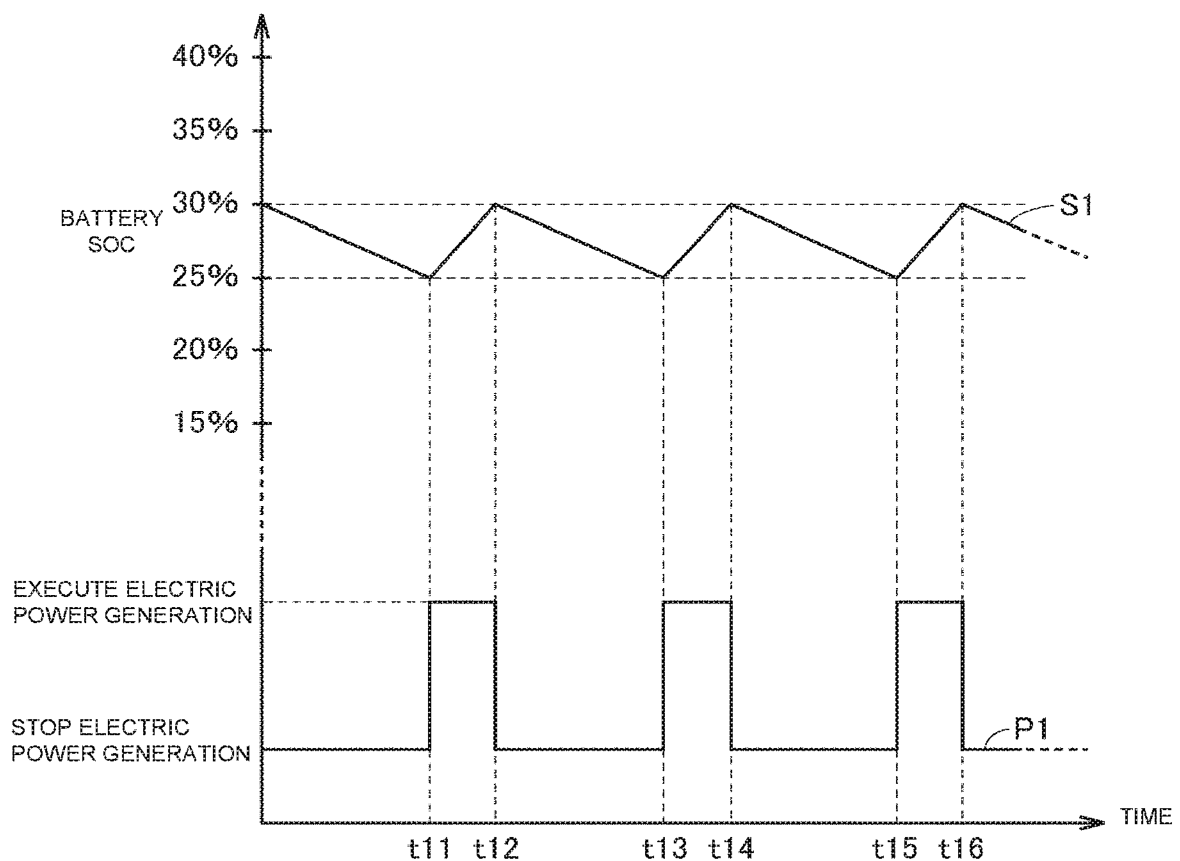
FIG. 3 is a chart describing the charging control according to the first embodiment when the vehicle weight is small.
Figure 4:
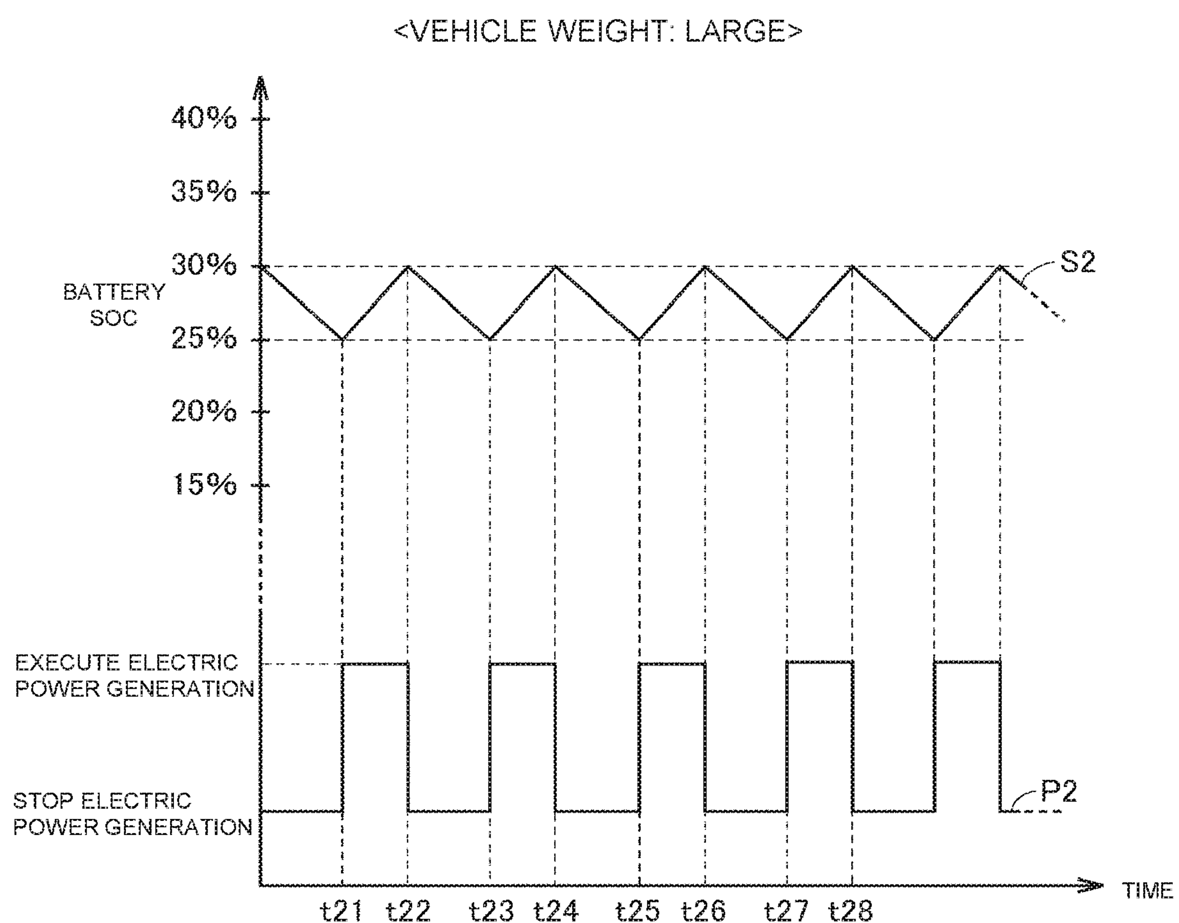
FIG. 4 is a chart describing the charging control according to a comparative example when the vehicle weight is large.

FIG. 3 is a chart for describing the charging control when the vehicle weight is small according to the first embodiment. FIG. 4 is a chart for describing the charging control in a conventional charging control device, as a comparative example, when the vehicle weight is large. Lines S1 and S2 shown in FIGS. 3 and 4, respectively, indicate changes in the SOC of the battery in the same vehicle but having different loads if the process shown in FIG. 2 is repeated while the vehicle is moving when the charging start SOC and the charging stop SOC are set at 25 percent and 30 percent, respectively.

As shown in FIG. 3, the SOC of the battery changes in a manner indicated by the line S1 in a lightly loaded vehicle. When the SOC of the battery is reduced by moving the vehicle (and hence consuming the electric power in the battery) to 25 percent or less at a timing t11, the engine electric power generation is executed as shown by the line P1, and the battery is charged by the engine generated electric power. While the engine power generation is executed, the engine generated electric power is supplied to the battery, and the SOC of the battery is increased. When the SOC of the battery is increased to 30 percent or greater at the timing t12, the engine electric power generation is stopped as shown by the line P1. The SOC of the battery starts reducing again by the stop of the engine electric power generation. The engine is activated every time the SOC of the battery is reduced to 25 percent or less (at timings t11, t13, t15), and the charging of the battery by the engine generated electric power is executed. Once the SOC of the battery increases to 30 percent or greater (the timings t12, t14, t16), the engine electric power generation is stopped, so that the charging of the battery by the engine generated electric power is stopped.

As shown in FIG. 4, the SOC of the battery changes in a manner indicated by the line S2 in a heavily loaded vehicle. The engine is activated every time the SOC of the battery is reduced to 25 percent or less (the timings t21, t23, t25, t27), and the charging of the battery by the engine generated electric power is executed (see the lines S2 and P2 in FIG. 4). When the SOC of the battery is increased to 30 percent or greater (the timing t22, t24, t26, t28), the operation of the engine is stopped, so that the charging of the battery by the engine generated electric power is stopped (see the lines S2 and P2 in FIG. 4).

When the vehicle weight is large, the consumption of the electric power of the battery is increased while the vehicle is moving. Thus, when the vehicle weight is large (see FIG. 4), as compared with when the vehicle weight is small (see FIG. 3), the SOC of the battery reduces faster while the vehicle is moving. Therefore, in the case in which the vehicle weight is large, the SOC of the battery is reduced to the charging start SOC (25 percent) in a short time after stopping the charging of the battery at the charging stop SOC (30 percent), and the next charging is started. For example, comparing the period of time from t12 to t13 in FIG. 3 with the period of time from t22 to t23 in FIG. 4, the period of time from t22 to t23 is shorter. Accordingly, when the vehicle weight is large, the frequency of charging while the vehicle is moving is increased, as compared with when the vehicle weight is small.

In the vehicle 100 of the present embodiment, the charging of the battery 10 is started by activating the engine 20. Thus, a time lag (response delay) is caused at the start of the charging from the activation of the engine 20 to the start of the charging of the battery 10 by the engine generated electric power. In addition, an energy loss occurs during the period of time from the activation of the engine 20 to start the combustion in the combustion chamber (not shown) of the engine 20 until the electric power is stably generated by the engine 20, Since the response delay and the energy loss occur in the vehicle 100, it is not desirable to increase the frequency of charging (hence the frequency of the charging getting started).

In the vehicle 100, the HV-ECU 51 is configured to estimate the vehicle weight while the vehicle is moving and to set the charging stop SOC based on the estimated vehicle weight. For example, the HV-ECU 51 measures the acceleration of the vehicle while the vehicle 100 is moving and estimates the vehicle weight from the measured acceleration of the vehicle 100. For example, the vehicle weight (m) may be obtained by applying the force (F) for accelerating the vehicle 100 and the vehicle acceleration (a) when the force (F) is applied to the vehicle 100 to Newton's laws of motion "F=ma". The HV-ECU 51 of the present embodiment includes the weight estimator of the present disclosure.

In the present embodiment, the HV-ECU 51 sets the charging stop SOC so that the charging amount per charging while the vehicle is moving is increased as the vehicle weight becomes larger. The following will describe the charging control executed by the HV-ECU 51 with reference to FIGS. 2, 4, and 5.

Figure 5:
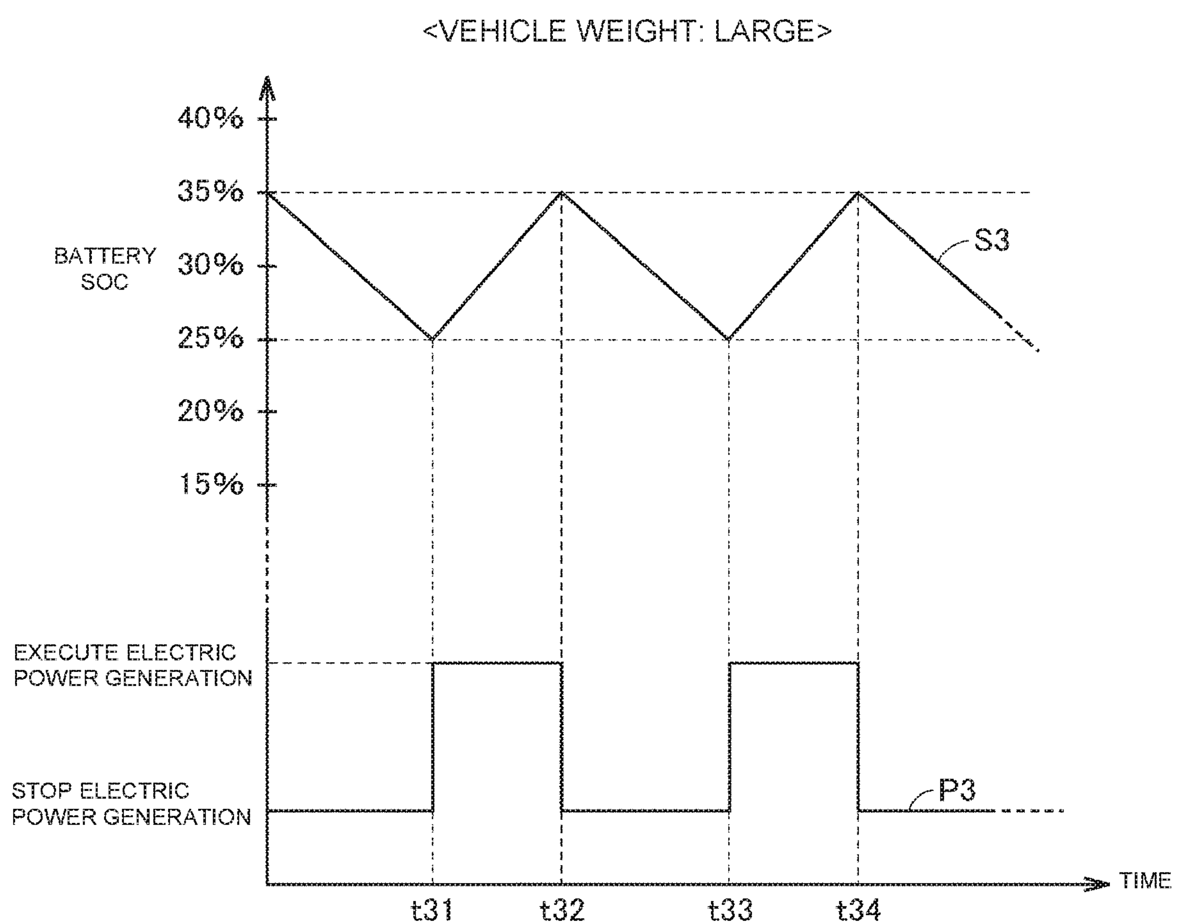
FIG. 5 is a chart describing the charging control according to the first embodiment when the vehicle weight is large.

FIG. 5 is a chart for describing the charging control according to the first embodiment when the vehicle weight is large. The line S3 in FIG. 5 indicates a change in the SOC of the battery when the process shown in FIG. 2 is repeatedly performed in the same vehicle (having the same load) shown in FIG. 4 while the vehicle is moving when the charging start SOC and the charging stop SOC are set at 25 percent and 35 percent, respectively.

Referring to FIG. 5, the SOC of the battery is changed as indicated by the line S3 by executing the above-described charging control. The engine 20 is activated every time the SOC of the battery is reduced to 25 percent or less (at timings t31, t33), and the charging of the battery by the engine generated electric power is executed (see the lines S3 and P3 in FIG. 5), The operation of the engine 20 is stopped when the SOC of the battery increased to 35 percent or greater (at timings t32, t34), and the charging of the battery by the engine generated electric power is stopped (see the lines S3 and P3 in FIG. 5).

Comparing the charging control in FIG. 5 with the charging control in FIG. 4, the charging stop SOC is set higher in the charging control in FIG. 5, so that the charging amount per charging is increased. In the process in FIG. 2, the charging amount is controlled by the charging duration, so that the period of time from the timing t31 to t32 corresponding to the charging duration in FIG. 5 is longer than the period of time from the timings t21 to t22 corresponding to the charging duration in FIG. 4. In addition, if the charging amount per charging is increased, it takes longer to consume the stored electric power corresponding to the charging amount. For example, comparing the period of time from the timing t22 to t23 in FIG. 4 with the period of time from the timing t32 to t33 in FIG. 5, the period of time from the timing t32 to t33 is longer. Although the reduction speed of the SOC of the battery while the vehicle is moving is substantially the same, the frequency of the charging (the number of charging cycles per unit time) while the vehicle is moving is less in the charging control in FIG. 5 than in that in FIG. 4.

As has been described, when the vehicle weight is large, the charging of the battery 10 is executed more frequently while the vehicle is moving, as compared with when the vehicle weight is small (FIGS. 3 and 4). Setting the charging stop SOC higher increases the charging amount per charging while the vehicle is moving, so that the frequency of charging while the vehicle is moving may be reduced (FIGS. 4 and 5). In the vehicle 100 of the present embodiment, the HV-ECU 51 is configured to set the charging stop SOC so that the charging amount per charging while the vehicle is moving is increased as the vehicle weight becomes larger, thus preventing an excessive increase in the frequency of the charging while the vehicle is moving. Accordingly, the energy efficiency in the vehicle 100 may be increased by reducing the above-described energy loss at the start of charging.

For example, the HV-ECU 51 may be configured to execute the charging control shown in FIG. 3 (the charging start SOC set at 25% and the charging stop SOC set at 30%) when the vehicle weight is small and to execute the charging control shown in FIG. 5 (the charging start SOC set at 25% and the charging stop SOC set at 35%) when the vehicle weight is large.

The number of charging cycles per unit time while the vehicle is moving may be set at a constant value regardless of the vehicle weight if the vehicle weight is within a specified vehicle weight range. The number of charging cycles per unit time may be held constant by setting the charging stop SOC so that a change in the frequency of the charging due to a change in the vehicle weight (e.g., the increase in the frequency of the charging by the increase in the vehicle weight) is offset by a change in the frequency of the charging due to a change in the charging amount per charging cycle (e.g., a reduction in the frequency of the charging by increasing the charging amount per charging).

In the present embodiment, the charging start SOC is set at a constant value (e.g., a fixed value) regardless of the vehicle weight. The charging start SOC is set at, for example, a value at which sufficient electric power is outputted from the battery 10. The output electric power of the battery 10 tends to reduce as the SOC of the battery 10 reduces.

The charging stop SOC is variable depending on the vehicle weight. The variable range for the charging stop SOC is determined, for example, with the degradation of the battery 10 taken into consideration. The degradation of the battery 10 tends to progress as the SOC of the battery 10 becomes excessively high. The variable range for the charging stop SOC (especially, the upper limit value) is set so that the degradation of the battery 10 may be sufficiently suppressed, for example.

Figure 6:
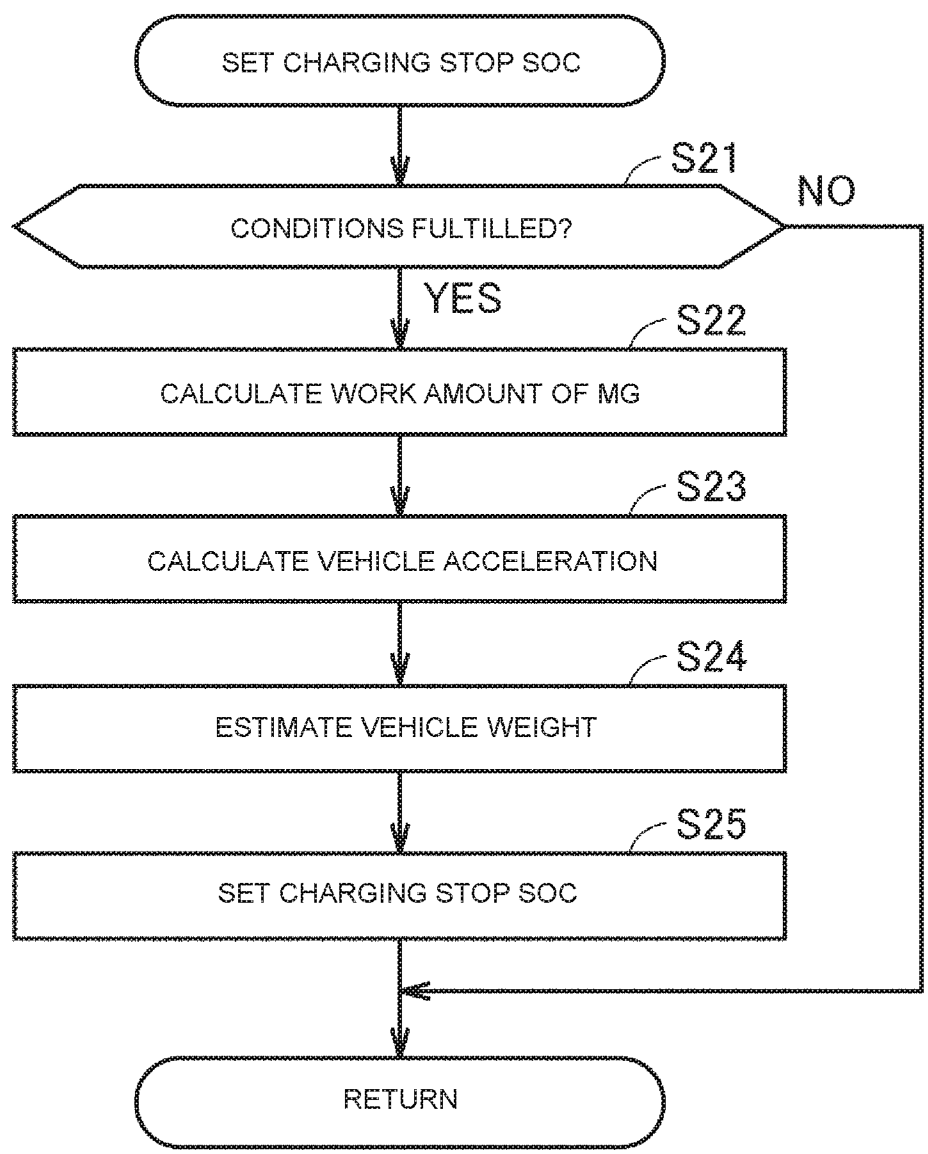
FIG. 6 is a flow chart showing a process of setting a charging stop SOC, which is executed by the controller of the vehicle according to the first embodiment.

The following will describe the process of setting the charging stop SOC executed by the HV-ECU 51 in detail with reference to FIG. 6. FIG. 6 is a flow chart of the process of setting the charging stop SOC by the HV-ECU 51. The process shown in this flow chart includes Steps S21 through S25, which is called from the main routine and performed at a specified interval while the vehicle 100 is moving.

Referring to FIG. 6, the HV-ECU 51 determines whether or not the specified conditions (hereinafter referred to as the weight estimation conditions) (Step S21) are fulfilled. The weight estimation conditions are set so that an accurate estimation of the vehicle weight may be accomplished. In the present embodiment, it is determined that the weight estimation conditions are fulfilled when all of the following requirements A through D are fulfilled. The weight estimation conditions are not limited to the following, but may be changed appropriately depending on the vehicle structure.

Requirement A: the vehicle 100 is moving straight on the flat land. Requirement B: the driving force of the MG 31 (motor for driving the vehicle) is stabilized within a specified range.

Requirement C: the temperature of the MG 31 (the motor for driving the vehicle) is stabilized within a specified range. Requirement D: disturbance (the electric loss due to the use of electricity other than driving) is sufficiently small.

Regarding the requirement A, the HV-ECU 51 may determine whether or not the vehicle 100 is moving on the flat land based on, for example, information received from the car navigation system 70. In addition, the HV-ECU 51 may determine whether not the vehicle 100 is moving straight based on whether or not the steering angle detected by the steering angle sensor 66 is within a specified range, for example.

Regarding the requirement B, the HV-ECU 51 determines whether or not the driving force of the MG 31 is stabilized within the specified range based on, for example, whether or not the accelerator opening detected by the accelerator sensor 65 is within a specified range and the change in the accelerator opening (change per unit time) is at or less than a specified value. For example, it is determined that requirement B is fulfilled when the accelerator pedal of the vehicle 100 is fully depressed (the opening degree of the accelerator at 100 percent continued) for a specified period of time.

Regarding the requirement C, the HV-ECU 51 determines whether or not the temperature of the MG 31 is stabilized within the specified range based on, for example, whether or not the temperature of the MG 31 measured by the monitoring unit 63 (specifically, temperature sensor) is within the specified range and a change in the temperature of the MG 31 (a change in the temperature per unit time) is equal to or less than the specified value.

Regarding the requirement D, the HV-ECU 51 determines whether or not the disturbance is sufficiently small based on the use of the specified electric load. For example, the HV-ECU 51 determines that the requirement D is fulfilled if the electric load causing large disturbance (e.g., air-conditioner and auxiliary machines) is not used.

If at least one of requirements A through D is not fulfilled, it is determined that the weight estimation conditions are not met (NO at Step S21), and the process ends and returns to the main routine.

If the requirements A through D are all fulfilled, on the other hand, it is determined that the vehicle 100 is in the above-described weight estimation conditions (YES at Step S21), and the HV-ECU 51 starts the estimation of the vehicle weight. During the weight estimation period, which will be described later, information of the vehicle 100 (e.g., driving force of the MG 31 and the rotation speed of the MG 31) is stored in the memory device of the HV-ECU 51. Thus, the CPU of the HV-ECU 51 may obtain the past information from the memory device if required.

The HV-ECU 51 calculates a work amount of the MG 31 (hereinafter referred to as the MG work amount) for a specified period (hereinafter referred to as the weight estimation period) at Step S22. The HV-ECU 51 obtains the MG work amount by, for example, calculating the driving force of the MG 31 from the output demand value to the MG 31 and calculating the driving force of the MG 31 in the weight estimation period by integration. For example, the starting point of the weight estimation period is at a timing at which the estimation of the vehicle weight starts. The weight estimation period (the time from the starting point to the ending point) may be set to, for example, three to five seconds.

Consequently, the HV-ECU 51 calculates a change in the vehicle speed (the vehicle acceleration) during the weight estimation period at Step S23. The HV-ECU 51 may calculate the vehicle acceleration based on, for example, the difference between the rotation speed of the MG 31 at the starting point of the weight estimation period and that at the ending point of the weight estimation period.

Then, the HV-ECU 51 estimates the vehicle weight at Step S24 based on the MG work amount and the acceleration of the vehicle 100, which are obtained at Step S22 and Step S23, respectively. The estimation of the vehicle weight may be accomplished by, for example, a method described in the following.

The relation among the force (F) for accelerating the vehicle 100, the vehicle acceleration (a) when the force (F) is applied to the vehicle 100, and the vehicle weight (m)

corresponds to the Newton's laws of motion "F=ma", The force (F) corresponds to a value obtained by subtracting the driving force of the driving wheel 40 from the travel resistance which corresponds to the total of various resistances such as the internal resistance, the rolling resistance, the air resistance, and the hill climbing resistance. In general, the relation between the travel resistance (Unit: N) and the vehicle speed V (km/h) may be expressed by an equation, "the travel resistance=f0+f1 V+f2 V2 (f0: the constant term, f1: the coefficient of the first order for V, f2: the coefficient of the second order term for V)".

The driving force of the driving wheel 40 during the weight estimation period corresponds to the MG work amount. The travel resistance when the weight estimation conditions are fulfilled is a reproducible value, which may be predetermined based on an experimental result. With the travel resistance determined, the MG work amount, the vehicle acceleration, and the vehicle weight are determined based on the above-mentioned equation, "F=ma". In the present embodiment, the information indicating the relation among the MG work amount, the acceleration of the vehicle, and the vehicle weight (hereinafter referred to as the weight estimation information) are predetermined by experiments and stored in the memory device of the HV-ECU 51. The weight estimation information may be a map, a table, an equation, or a model. The weight estimation information may be formed by a combination of a plurality of maps.

By referring to the above-described weight estimation information, the HV-ECU 51 estimates the weight of the vehicle 100 (the vehicle weight) from the MG work amount and the vehicle acceleration, which are obtained at Step S22 and Step S23, respectively.

Subsequently, at Step S25, the HV-ECU 51 sets the charging stop SOC based on the estimated vehicle weight obtained at Step S24. For example, the HV-ECU 51 determines the charging stop SOC corresponding to the vehicle weight by referring to the information indicating the relation between the vehicle weight and the charging stop SOC (hereinafter referred to as the charging stop SOC setting information). The charging stop SOC setting information may be provided by any of a map, a table, an equation, and a model. The charging stop SOC setting information may be provided by a combination of a plurality of maps.

Figure 7:
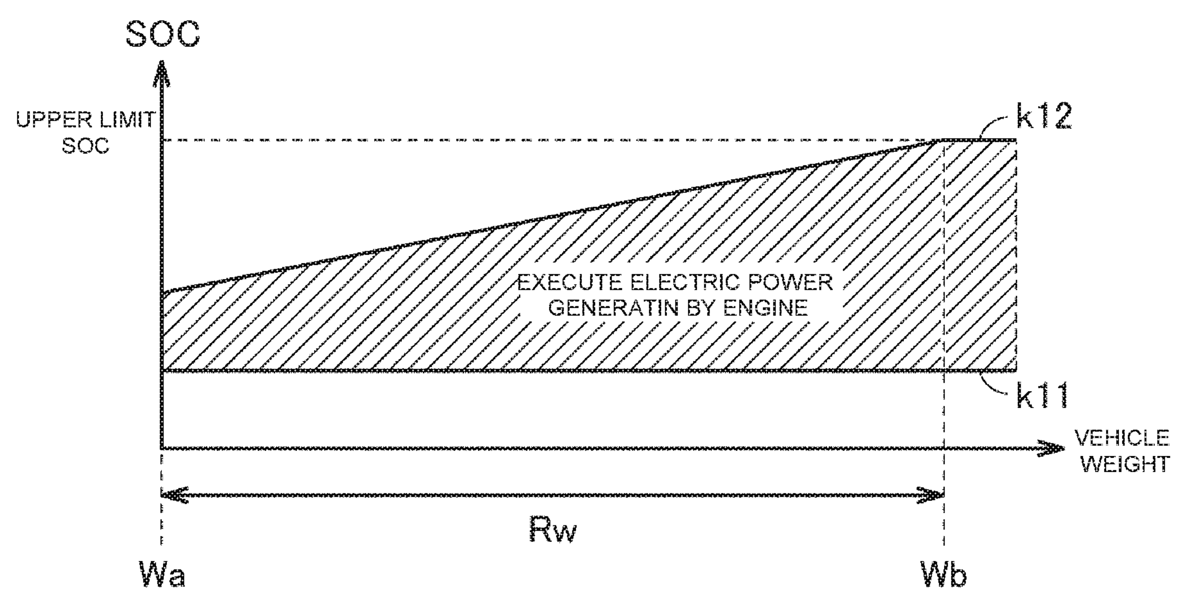
FIG. 7 is chart showing an example of charging stop SOC setting information according to the first embodiment.

FIG. 7 is a chart describing the charging stop SOC setting information according to the present embodiment. The line k12 in FIG. 7 shows the charging stop SOC setting information (more specifically, the map indicating the relation between the vehicle weight and the charging stop SOC). In addition, in FIG. 7, the line k11 indicates the charging start SOC according to the present embodiment. The vehicle weight range in the charging stop SOC setting information (the range of the horizontal axis of FIG. 7) may be set, for example, from the weight of the vehicle body (no loading) to the value obtained by adding the weight of passengers when the maximum number of passengers permitted for a vehicle is on board and the maximum loading (catalogue value) to the weight of the vehicle body.

In the process shown in FIG. 2, the engine electric power generation is executed when the SOC of the battery 10 is reduced to the charging start SOC or less, and the engine electric power generation stops when the SOC of the battery 10 is increased to the charging stop SOC or greater. Thus, the engine electric power generation is executed when the SOC of the battery 10 is equal to or greater than the charging start SOC and equal to or less than the charging stop SOC (the range between the line k11 and the line k12 shown by the hatching).

Referring to FIG. 7, as indicated by the line k12, the charging stop SOC becomes higher as the vehicle weigh becomes larger when the vehicle weight is within the specified vehicle weight range Rw (i.e., the vehicle weight is equal to or greater than Wa and equal to or less than Wb). However, if the vehicle weight reaches Wb, the charging stop SOC reaches the upper limit SOC, so that the charging stop SOC is set at the upper limit SOC when the vehicle weight is greater than Wb. The upper limit SOC in FIG. 7 is set at a value that permits sufficiently suppressing the degradation of the battery 10. Since the degradation of the battery 10 may be enhanced when the SOC of the battery 10 exceeds the upper limit SOC, the charging stop SOC setting information indicated by the line k12 is set at a value that does not exceed the upper limit SOC.

In addition, as indicated by the line k11, the charging start SOC is set at the constant value regardless of the vehicle weight in the present embodiment. Thus, the charging start SOC is constant within the vehicle weight range Rw. As indicated by the lines k11, k12, when the vehicle weight is within the vehicle weight range Rw, the charging amount per charging (the increase of the SOC from the charging start SOC to the charging stop SOC) is increased as the vehicle weight becomes larger. This prevents an increase in the frequency of the charging while the vehicle is moving. The above-described energy loss at the start of charging may be reduced, and the energy efficiency in the vehicle 100 may be increased.

The following will describe a modified embodiment. The charging stop SOC setting information is not limited to the map shown in FIG. 7, but may be modified appropriately. For example, values of the charging stop SOC appropriate for the vehicle weight are determined through the experiments and more complex charging stop SOC setting information (e.g., map including a nonlinear change and a change in stepped manner) is formed, and such values and such information are stored in the memory device of the HV-ECU 51. By referring to the charging stop SOC setting information, the HV-ECU 51 may set the charging stop SOC corresponding to the vehicle weight. Even if the vehicle weight is changed, the charging control appropriate for the current vehicle weight may be achieved.

Instead of the charging stop SOC setting information, the charging stop SOC may be set by using information indicating the relation between a value obtained by subtracting the weight of vehicle body from the vehicle weight (the weight of load and passengers) and the charging stop SOC.

The charging start SOC need not be set at a fixed value. For example, the charging start SOC is variable depending on a parameter other than the vehicle weight (e.g., the temperature of the battery 10). The vehicle 100 may be configured to set the charging start SOC by using the estimated vehicle weight (i.e., the charging start SOC variable depending on the vehicle weight). For example, information indicating the relationship between the vehicle weight and the charging start SOC may be stored in the memory device of the HV-ECU 51.

The method for estimating the vehicle weight is not limited to the method described in the above-described embodiment, and may be changed appropriately depending on the configuration of vehicles. For example, the vehicle may be provided with a vehicle speed sensor and/or an acceleration sensor and configured to obtain the vehicle acceleration by using the values measured by the vehicle speed sensor and/or the acceleration sensor. In a case where the requirement D is not included in the weight estimation conditions, since the driving force of the driving wheel 40 may be changed by the electric power loss by the disturbance, the charging stop SOC setting information may be corrected based on the electric loss due to the disturbance, considering the driving force of the driving wheel 40 changeable by the electric power loss by the disturbance. In addition, considering that the travel resistance is changeable depending on the weather and the road grade, it may be configured to correct the charging stop SOC based on the weather information and the road grading information at the current location of the vehicle. The information of the current location of the vehicle and the road grade may be obtained from, for example, the car navigation system 70. The weather information may be obtained by the use of, for example, the known services offered by the Meteorological Agency and the communication enterprise through radio communication. The weather may be estimated based on the movement of wiper (not shown) of the vehicle and/or the measured value of the outside temperature sensor (not shown).

The estimated vehicle weight may be used not only for the charging control of the battery device but also for other use. For example, the estimated vehicle weight may be used for the control of the output for driving the vehicle (e.g., the output of the driving motor).

The vehicle is not limited to a truck, but may be a bus, a passenger vehicle, or an automated guided vehicle (HGV). The configuration of the vehicle is not limited to the configuration shown in FIG. 1, but may be changed appropriately. The vehicle is not limited to a series hybrid vehicle, but may be, for example, a range extender electric vehicle. In addition, the internal combustion engine, the electric motor, and the generator are not limited to those used in the above-described embodiment, and a type or the number of such parts may be changed appropriately. For example, a gasoline engine may be used as an internal combustion engine.

The modified embodiment may be practiced with the combination of all or part of the above-described features. The above-described embodiments of the present disclosure are examples and not intended to limit the scope of the present disclosure. The scope of the present disclosure is to be construed not by the above description but by claims and intended to include any modifications corresponding to the scope of the claims.

What is claimed is:

1. A vehicle provided with a generator, the generator being configured to generate electric power by using motive power outputted from an internal combustion engine, the vehicle provided with a generator comprising:

an electric power storage device in which the electric power generated by the generator is stored;

an electric motor configured to drive the vehicle, the electric motor being configured to be driven by at least one of electric power discharged from the electric power storage device and the electric power generated by the generator; and a controller configured to execute charging control of the electric power storage device and estimate a current vehicle weight while the vehicle is moving, wherein the vehicle is a series hybrid vehicle, wherein while the vehicle is driven by the electric motor, the controller is configured to start operation of the internal combustion engine to start charging the electric power storage device by the generator when a state of charge (SOC) of the electric power storage device is reduced to a charging start SOC or less, and to stop the operation of the internal combustion engine to stop charging the electric power when the SOC of the electric power storage device is at or greater than a charging stop SOC, wherein the charging stop SOC is set based on the current vehicle weight estimated by the controller, and wherein the controller is configured to set the charging stop SOC so that a charging amount per cycle increases as the current vehicle weight becomes larger.

2. The vehicle provided with the generator according to claim 1, wherein the charging stop SOC increases as the current vehicle weight becomes larger within a specified vehicle weight range, and the charging start SOC is constant within the specified vehicle weight range.

3. The vehicle provided with the generator according to claim 1, wherein the charging stop SOC is set so that the number of charging cycles per unit time while the vehicle is moving is a constant value regardless of the current vehicle weight within the specified vehicle weight range.

4. The vehicle provided with the generator according to claim 1, wherein the controller is configured to estimate the current vehicle weight based on weight estimation conditions being satisfied.

5. The vehicle provided with the generator according to claim 1, wherein the charge stop SOC is set based on road grade information at a current location of the vehicle.

6. The vehicle provided with the generator according to claim 1, wherein the weight of the vehicle is estimated based on a calculated work amount of the drive motor and an acceleration of the vehicle.

7. A vehicle provided with a generator, the generator being configured to generate electric power by using motive power outputted from an internal combustion engine, the vehicle provided with a generator comprising:

an electric power storage device in which the electric power generated by the generator is stored;

an electric motor configured to drive the vehicle, the electric motor being configured to be driven by at least one of electric power discharged from the electric power storage device and the electric power generated by the generator; and a controller configured to execute charging control of the electric power storage device and estimate a current vehicle weight while the vehicle is moving, wherein while the vehicle is driven by the electric motor, the controller is configured to start operation of the internal combustion engine to start charging the electric power storage device by the generator when a state of charge (SOC) of the electric power storage device is reduced to a charging start SOC or less, and to stop the operation of the internal combustion engine to stop charging the electric power when the SOC of the electric power storage device is at or greater than a charging stop SOC, wherein the charging stop SOC is set based on the current vehicle weight estimated by the controller, wherein the controller is configured to estimate the current vehicle weight based on a weight estimation conditions being satisfied, and wherein the weight estimation conditions are satisfied based on a determination that the vehicle is moving straight on flat land, a driving force of the motor is stabilized within a predetermined range, a temperature of the motor is stabilized within a predetermined range, and electric loss due to components other than the motor is below a threshold value.

8. A vehicle provided with a generator, the generator being configured to generate electric power by using motive power outputted from an internal combustion engine, the vehicle provided with a generator comprising:

an electric power storage device in which the electric power generated by the generator is stored;

an electric motor configured to drive the vehicle, the electric motor being configured to be driven by at least one of electric power discharged from the electric power storage device and the electric power generated by the generator; and a controller configured to execute charging control of the electric power storage device and estimate a current vehicle weight while the vehicle is moving, wherein while the vehicle is driven by the electric motor, the controller is configured to start operation of the internal combustion engine to start charging the electric power storage device by the generator when a state of charge (SOC) of the electric power storage device is reduced to a charging start SOC or less, and to stop the operation of the internal combustion engine to stop charging the electric power when the SOC of the electric power storage device is at or greater than a charging stop SOC, wherein the charging stop SOC is set based on the current vehicle weight estimated by the controller, and wherein the charge stop SOC is set based on weather information at a current location of the vehicle.

9. The vehicle provided with the generator according to claim 8, wherein the weather information is determined based on one or more of movement of a wiper of the vehicle and information provided by an outside temperature sensor of the vehicle.

* * * * *